United States Patent [19]
Niiyama

[11] Patent Number: 5,507,700
[45] Date of Patent: Apr. 16, 1996

[54] HYDRAULIC CONTROL UNIT FOR A VEHICLE AUTOMATIC TRANSMISSION

[75] Inventor: Tsunefumi Niiyama, Kamifukuoka, Japan

[73] Assignee: Honda Giken Kogyo Kabushiki Kaisha, Tokyo, Japan

[21] Appl. No.: 168,078

[22] Filed: Dec. 15, 1993

[30] Foreign Application Priority Data

Dec. 15, 1992 [JP] Japan .................................. 4-354095
Jan. 26, 1993 [JP] Japan .................................. 5-029808

[51] Int. Cl.$^6$ .................................................. B60K 41/10
[52] U.S. Cl. .................................................. 475/129
[58] Field of Search .................................. 475/127, 128, 475/129

[56] References Cited

U.S. PATENT DOCUMENTS

| | | | |
|---|---|---|---|
| 3,418,871 | 12/1968 | Cartwright et al. | 475/129 X |
| 4,046,033 | 9/1977 | Hashimoto et al. | 475/129 X |
| 4,495,838 | 1/1985 | Gooch | 477/126 X |
| 4,633,738 | 1/1987 | Timte | 475/129 X |
| 5,111,719 | 5/1992 | Okahara | 475/129 |
| 5,288,279 | 2/1994 | Sakai et al. | 475/128 X |

*Primary Examiner*—Charles A. Marmor
*Assistant Examiner*—Nathan O. Jensen
*Attorney, Agent, or Firm*—Lyon & Lyon

[57] ABSTRACT

A hydraulic control unit for an automatic transmission having a plurality of power transmitting paths and a plurality of engaging clutches and/or brakes for selecting any one of the transmitting paths to set a gear position. The unit comprises a regulator valve for producing a line pressure, an operating pressure control valve for producing an operating pressure supplied to the engaging clutch or brake by regulating the line pressure from the regulator valve, and a line pressure switching valve for making the line pressure produced by the regulator valve low at a specified gear position when a target operating pressure set by the operating pressure control valve is lower than a specified value and making the line pressure high when the target operating pressure is higher than the specified value.

13 Claims, 10 Drawing Sheets

PRIOR ART

HYDRAULIC CONTROL UNIT FOR A VEHICLE AUTOMATIC TRANSMISSION

BACKGROUND OF THE INVENTION

1. Field of The Invention

The present invention relates to a vehicle automatic transmission with means for automatically controlling the gear shifts thereof, and particularly relates to a hydraulic control unit for controlling the operation of the automatic transmission.

The present invention also relates to a hydraulic control unit for an automatic transmission with means to appropriately engage a frictional engaging element for engine braking.

2. Description of The Prior Arts

Automatic Transmissions for use on automobiles and other vehicles have a plurality of power transmitting gear trains each of which has a specific rear ratio. These transmitting gear trains are selectively switched into operation to effectuate a gear shift by controlling engagement or disengagement of frictional engaging means such as clutches and brakes. The engagement of the frictional engaging means is hydraulically controlled by a hydraulic control unit. The hydraulic control unit often comprises a hydraulic regulator valve for producing a line pressure, and an operating pressure control means for producing an operating pressure supplied to the frictional engaging means by regulating the line pressure. The operating pressure control means is provided to reduce a shift-shock which is caused when engaging the frictional engaging means. Specifically, a duty-ratio on-off controlled solenoid valve is often used for the operating pressure control means. An apparatus to reduce a shift-shock during a shift is disclosed in the Japanese Patent Publication No. 61-136055.

In the automatic transmission, a specified frictional engaging means which is engaged at a specified gear position (such as at a reverse gear position) is sometimes required to have a fairly large engaging force because of the gear ratio between the power source (the engine) and the specified frictional engaging means. To obtain such a large engaging force, a high operating pressure is often needed.

Therefore some hydraulic control units have a line pressure switching means to control the regulator valve so as to produce a high line pressure and a low line pressure. The high line pressure is used at the specified gear position (such as at the reverse gear position) and the low line pressure is used at the other gear positions (such as at the forward gear positions).

However, the engagement of the specified frictional engaging means under the high line pressure may cause a jerky shift which is not preferable. It is desirable to control the operating pressure control means so as to supply a low operating pressure during engagement (from the start of engagement until the completion of engagement), and then to supply a high operating pressure after completion of engagement to firmly maintain the engaging state of the specified frictional engaging means.

Figure 6:
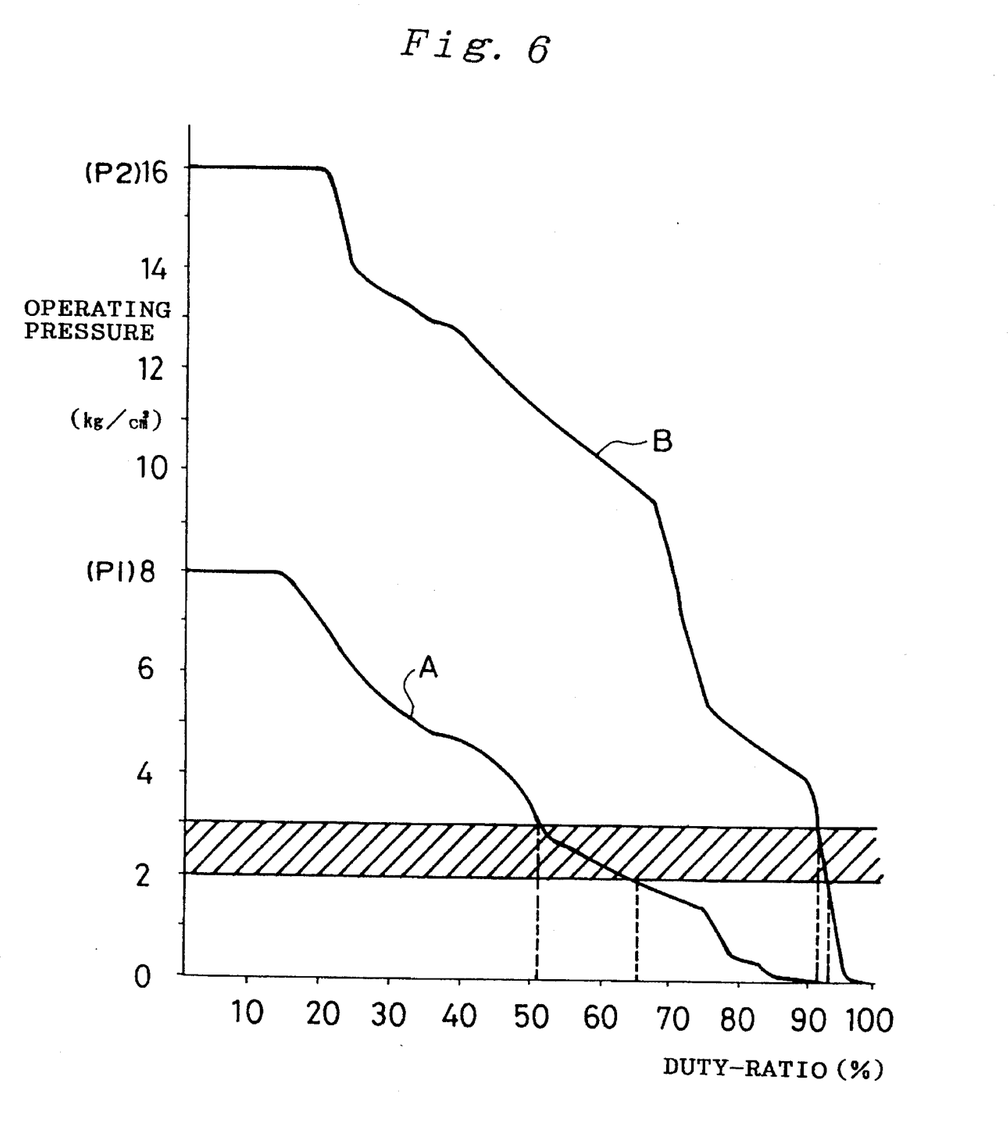
FIG. 6 is a graph showing characteristics of a duty-ratio controlled solenoid valve used in the hydraulic control unit.

However, if the high line pressure is supplied to the operating pressure control means to produce the low operating pressure, it is difficult to produce it from the high line pressure. For example, relationships between duty-ratios (%) and operating pressures (kg/mm$^2$) in the duty-ratio on-off controlled solenoid valve (of normal open type) are shown in FIG. 6. As shown by a line "B" in the figure, if the high line pressure (P2) is used, the duty ratios required to produce the low operating pressures to engage the specified frictional engaging means smoothly (the operating pressures within the shaded range in the figure) must be controlled within a very narrow range. Since the duty ratios are controlled in correspondence with the electric voltage supplied to the solenoid, it is very difficult to control the duty ratio within the narrow range.

In an automatic transmission, as described above, shift controls are carried out by selecting a gear train (a power transmitting path) from a plurality of gear trains which are included in the transmission. The gear train is selected by engaging one or two frictional engaging means such as clutches and brakes. A specified gear position corresponding to a specified gear train, for example 1ST gear position, often includes a one-way clutch or one-way brake. The one-way clutch or one-way brake allows only one-way transmission of power, i.e. it allows a power transmission from an engine to wheels, but it does not allow a power transmission from the wheels to the engine. Accordingly, when the 1ST gear position is selected with a one-way clutch being operated, no engine brake can be effectuated during deceleration running.

However, engine brake is sometimes required during deceleration running at 1ST gear position to effectively slow down the vehicle speed. In order to make the engine brake available, a specified frictional engaging means (an engine-brake engaging means) is engaged to directly connect an input member with an output member of the one-way clutch, allowing the power transmission from the wheels to the engine.

Meanwhile, a torque converter which is included in an automatic transmission often comprises a lock-up means. The lock-up means as well as the engine brake engaging means are usually operationally controlled by a common operational pressure.

Figure 10:
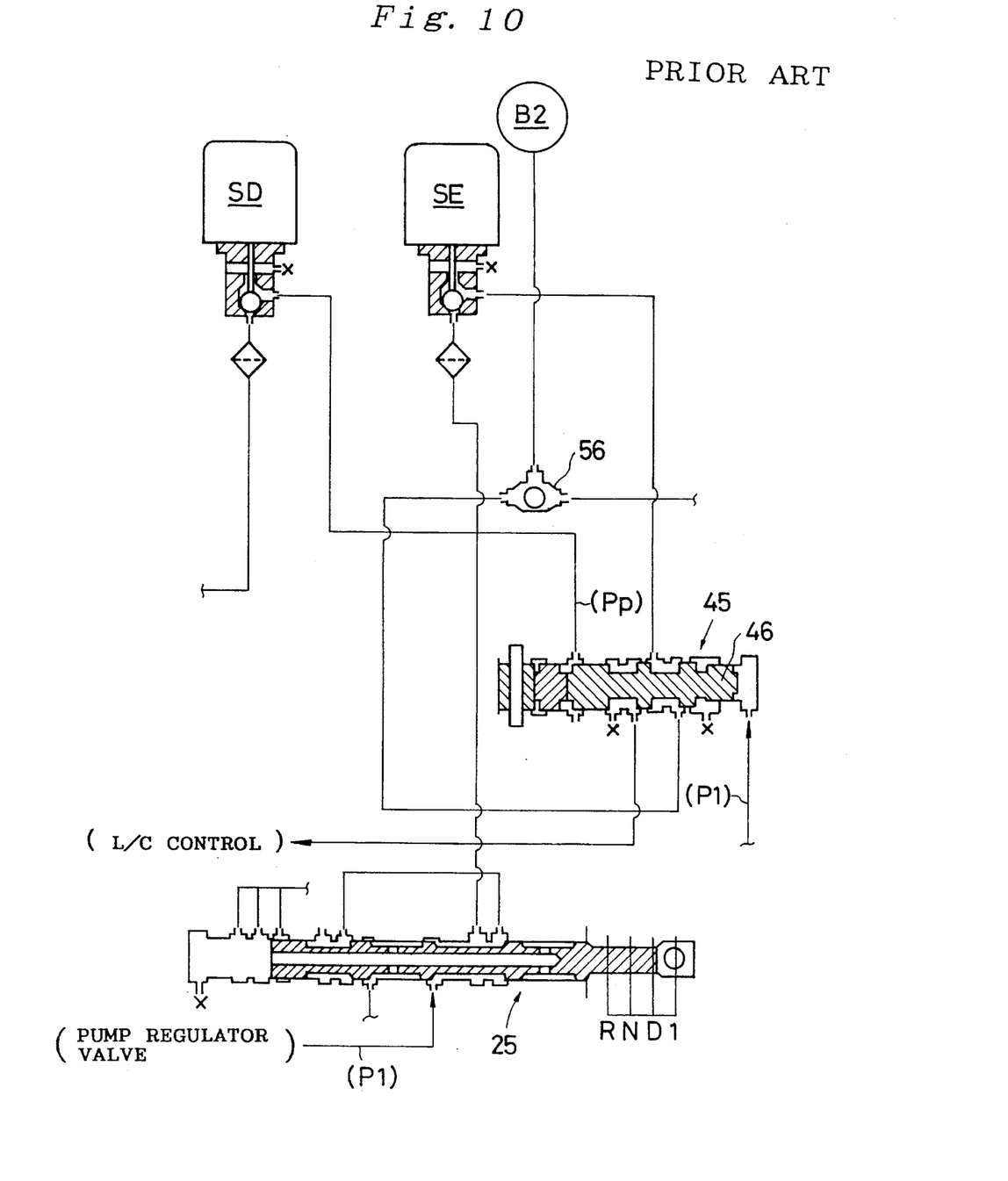
FIG. 10 is a hydraulic circuit diagram of the prior art hydraulic control unit.

One example of a prior art hydraulic circuit to control operations of the engine brake engaging means and the lock-up means is shown in FIG.10.

The hydraulic circuit comprises an engine brake frictional engaging element B2, a switching valve 45 by which an operating hydraulic pressure is selectively supplied through a shuttle valve 56 to the engine brake engaging means B2 and a lock-up clutch (L/C) of a torque converter (not shown), a solenoid valve SE (an operating pressure control means) which controls the operating pressure supplied to the switching valve 45, and a manual valve 25 which controls the supply of a line pressure P1 (a base pressure) to the solenoid valve SE and which is shifted to a position corresponding to a shift range selected based on the driver's operation of a shift lever. It further comprises a solenoid valve SD which controls a supply of a pilot pressure Pp to the switching valve 45 to control the operation of the switching valve. In U.S. Pat. No. 4,936,166, a hydraulic circuit in which an engine brake engaging means and a lock-up clutch control means are controlled by a common pressure supplied from one solenoid valve is disclosed.

In the above constructed hydraulic circuit, when the manual valve 25 is shifted to a position corresponding to "1-range", oil under the line pressure P1 exerted from a pump (not shown) and regulated by a regulator valve is supplied to the solenoid valve SE. Then, when the solenoid valve SE is opened, the oil under the line pressure P1 is supplied to the switching valve 45.

Since the solenoid valve SD is closed and the pilot pressure is not applied on the switching valve 45 at 1-range, a spool 46 of the switching valve 45 is shifted to the left biased by the line pressure Pl applied on the right end thereof, whereby the operating pressure is supplied to the engine brake engaging means B2. Accordingly, the solenoid valve SE can control the operation of the engine brake engaging means B2 by a supply control of the line pressure thereto to control the engine braking.

When the manual valve 25 is shifted to a D-range, the operating pressure is supplied to the switching valve 45 through the opened solenoid valve SE. Since the solenoid valve SD is opened at D-range, the pilot pressure Pp is supplied to the left end of the switching valve 45 to move the spool 46 to the right. As a result, the operating pressure is supplied to the lock-up means no control the operation thereof. Therefore at D-range, when 1ST gear position is selected, the engine brake engaging means B2 is not engaged and no engine brake is available.

However, even if the manual valve is shifted to the D-range at which no engine braking is required, the switching valve may not shift to the lock-up control side because of, for example, a malfunction of the solenoid valve SD or a sticking of the spool of the switching valve. When the switching valve is not shifted to the lock-up control side, the operating pressure exerted from the solenoid valve SE is not supplied to the lock-up control means but is supplied to the engine brake engaging means, which is not preferable for smooth running of the vehicle.

SUMMARY OF THE INVENTION

It is an object of the invention to provide a hydraulic control unit for an automatic transmission by which the low operating pressure to engage the frictional engaging means smoothly can be produced easily.

It is another object of the invention to provide a hydraulic control unit by which the high operating pressure to firmly engage the specified frictional engaging means can also be produced easily after the completion of the engagement.

It is a further object of the invention to provide a hydraulic control unit to positively avoid an accidental supply of the operating pressure to the engine brake engaging means when a shift range in which no engine brake is required is selected.

In order to achieve the objects, a hydraulic control unit for an automatic transmission having a plurality of power transmitting paths and a plurality of engaging means for selecting any one of the transmitting paths to set a gear position comprises a regulator valve means for producing a line pressure, an operating pressure control means for producing an operating pressure supplied to the engaging means by regulating the line pressure from the regulator valve, and a line pressure switching means for making the line pressure produced by the regulator valve low at a specified gear position when a target operating pressure selected by the operating pressure control means is lower than a specified value and making the line pressure high when the target operating pressure is higher than the specified value.

The hydraulic control unit for an automatic transmission comprises a regulator valve means for producing a line pressure, an operating pressure control means for producing an operating pressure supplied to the engaging means by regulating the line pressure from said regulator valve, a shift lever for selecting a shift range, a manual valve moved to a position corresponding to the shift range selected by the shift lever, the operating pressure being allowed by said manual valve to be supplied to the engaging means corresponding to the selected shift range, an opening-closing valve disposed in a hydraulic passage connecting the operating pressure control means with an engine brake engaging means which is engaged when an engine braking is required, and the operations of the opening-closing valve being controlled based on the position of the manual valve. The opening-closing valve is opened when the manual valve is moved to a position corresponding to a shift range in which the engine brake is required, and it is closed when the manual valve is moved to a position corresponding to a shift range in which the engine braking is not required.

DETAILED DESCRIPTION OF THE PREFERRED EMBODIMENTS

Figure 1:
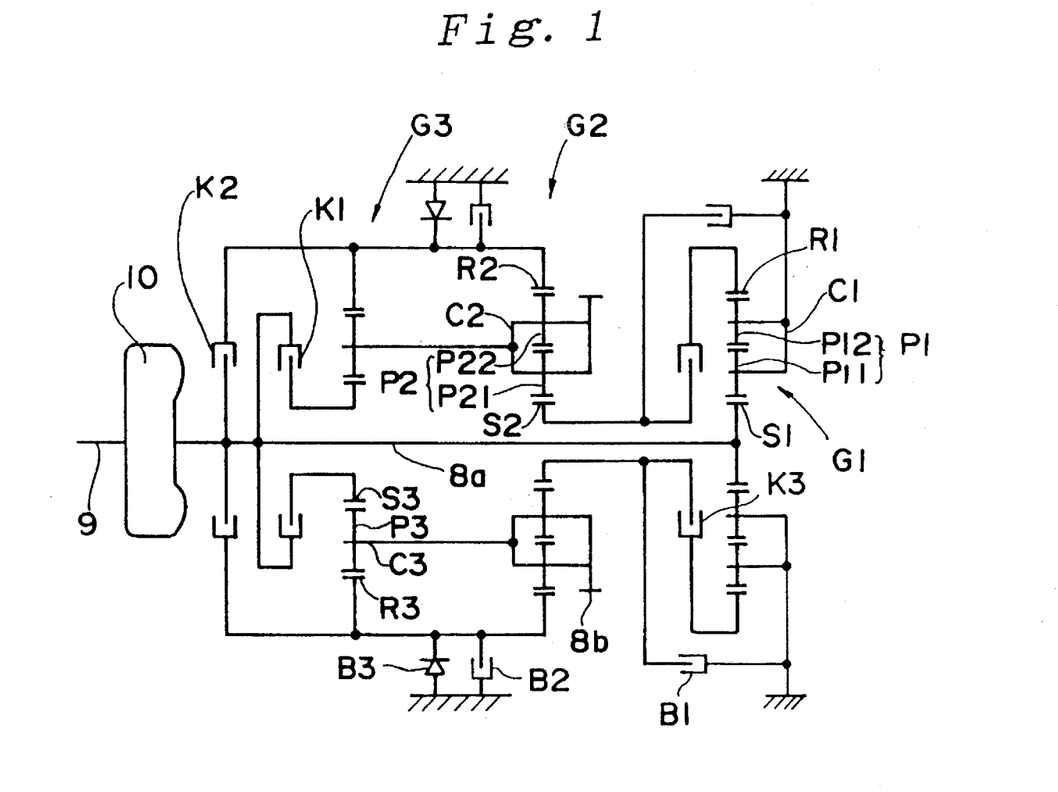
FIG. 1 is a diagrammatic drawing of an automatic transmission which has a hydraulic control unit according to the present invention.

A power-line construction of an automatic transmission which incorporates a hydraulic control unit according to the present invention is shown in FIG. 1. The automatic transmission is mounted in an automobile (not shown).

The automatic transmission shown in FIG. 1 comprises a torque converter 10 coupled to an engine output shaft 9 of the engine mounted in the automobile, and a transmission mechanism having a transmission input shaft 8a connected to the turbine of the torque converter 10.

The transmission mechanism has first, second and third planetary gear trains G1,G2,G3 disposed in serial relationship on the transmission input shaft 8a. The planetary gear trains G1,G2,G3 have respectively first, second and third sun gears S1,S2,S3 positioned centrally, first, second and third planetary pinions P1,P2,P3 meshing with the first, second and third sun gears S1,S2,S3 and revolvable around the first, second and third sun gears S1,S2,S3 while rotating about their own axes, first, second and third carriers C1,C2, C3 on which the first, second and third planetary pinions P1,P2,P3 are rotatably supported and rotatable in unison with the first, second and third planetary pinions P1,P2,P3 as they revolve around the first, second and third sun gears S1,S2,S3, and first, second and third ring gears R1,R2,R3 comprising internal gears meshing with the first, second and third planetary pinions P1,P2,P3.

Each of the first and second planetary gear trains G1,G2 comprises a double-pinion planetary gear train. The first planetary pinion P1 comprises two pinion gears P11,P12, and the second planetary pinion P2 comprises two pinion gears P21,P22. The third planetary gear train G3 comprises a single-pinion planetary gear train.

The first sun gear S1 is fixedly coupled to the input shaft 8a, and the first carrier C1 is fixed against rotation at all times. The first ring gear R1 is disconnectably coupled to the second sun gear S2 through a third clutch K3. The second sun gear S2 can be fixed against rotation by a first brake B1. The second carrier C2 is directly coupled to the third carrier C3, and also to an output gear 8b. Therefore, rotation of the second and third carrier C2,C3 is transmitted from the output gear 8b as output rotation of the transmission mechanism. The second ring gear R2 is directly coupled to the third ring gear R3. The second and third ring gears R2,R3 can be fixed against rotation by a second brake B2. The second and third ring gears R2,R3 are disconnectably coupled to the transmission input shaft 8a by a second clutch K2. The third sun gear S3 is disconnectably coupled to the transmission input shaft 8a through a first clutch K1. The second and third ring gears R2,R3 can also be braked by a one-way brake B3 disposed parallel to the second brake B2.

The first, second and the third clutches K1,K2,K3, and the first and second brakes B1,B2 are controlled, i.e., engaged and disengaged, to establish gear positions and control gear shifts or speed changes. Specifically, when the first, second and third clutches K1,K2,K3 and the first and second brakes B1,B2 are engaged and disengaged as shown in Table 1 below, the transmission mechanism can establish five forward gear positions (1ST,2ND,3RD,4TH and 5TH) and one reverse gear position (REV). Speed reduction ratios in the respective gear positions, which vary depending on the number of teeth of the gears, are also given by way of example. In the embodiment, the second brake corresponds to the engine brake frictional engaging means.

TABLE 1

| Gear Position | K1 | K2 | K3 | B1 | B2 | Ratio |
|---|---|---|---|---|---|---|
| 1ST | O | | | | (O) | 3.577 |
| 2ND | O | | | O | | 2.100 |
| 3RD | O | | O | | | 1.400 |
| 4TH | O | O | | | | 1.000 |
| 5TH | | O | O | | | 0.711 |
| REV | | | O | | O | 2.953 |

In Table 1, those clutches and brakes which are marked with O are engaged. The second brake B2 is marked with (O) in the 1ST gear position because power from the engine can be transmitted through one-way brake B3 even if the second brake B2 is not engaged. Specifically, when the first clutch K1 is engaged, power from the engine can be transmitted at the speed reduction ratio of the 1ST gear position and the 1ST gear position is established even if the second brake B2 is not engaged. However, since power from the road to the engine cannot be transmitted through the one-way brake B3, an engine braking cannot be applied in the 1ST gear position when the second brake B2 is not engaged. The engine braking can be applied in the 1ST gear position when the second brake B2 is engaged.

Figure 2:
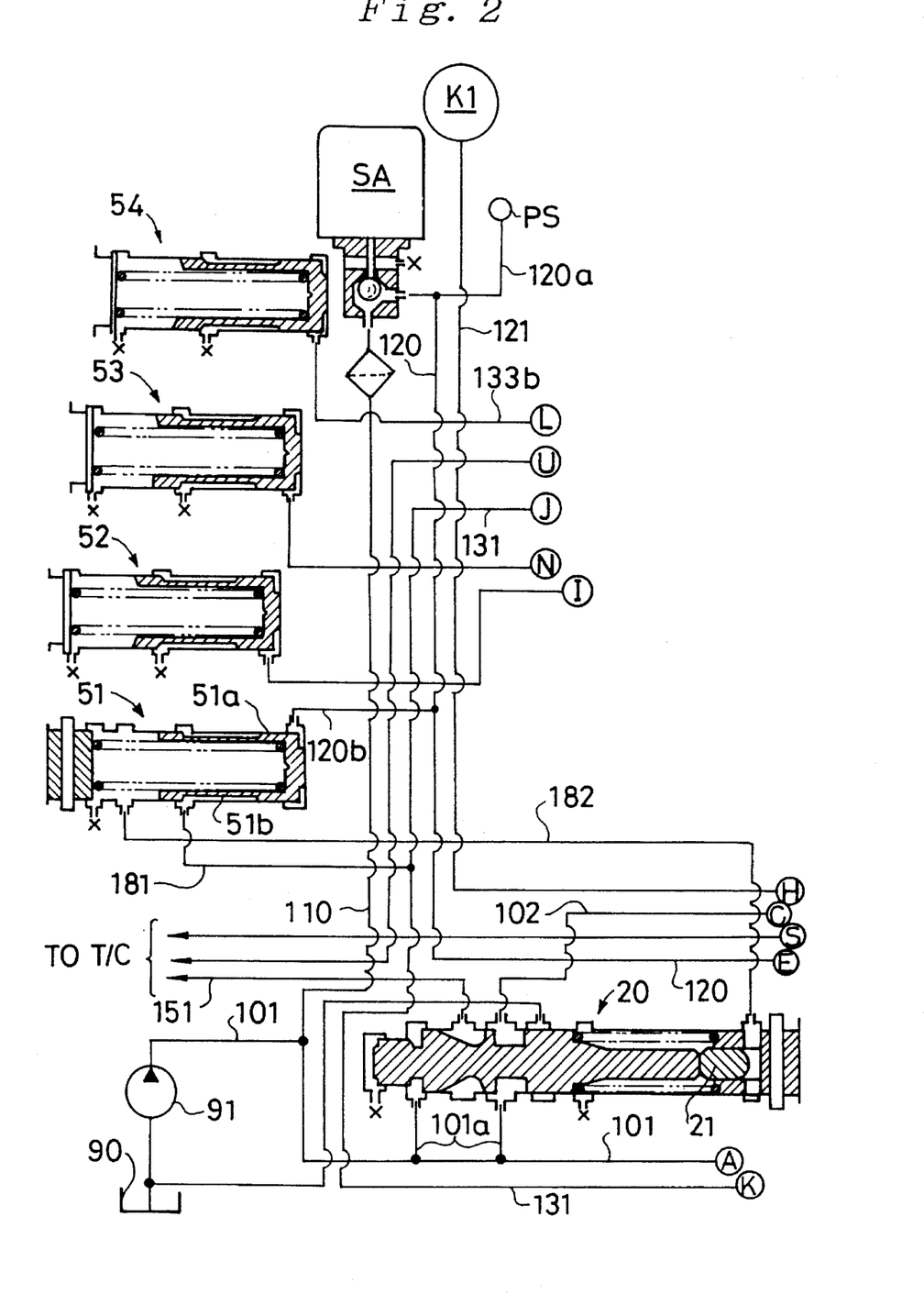
FIGS. 2 to 4 are hydraulic circuit diagrams of the hydraulic control unit.
Figure 3:
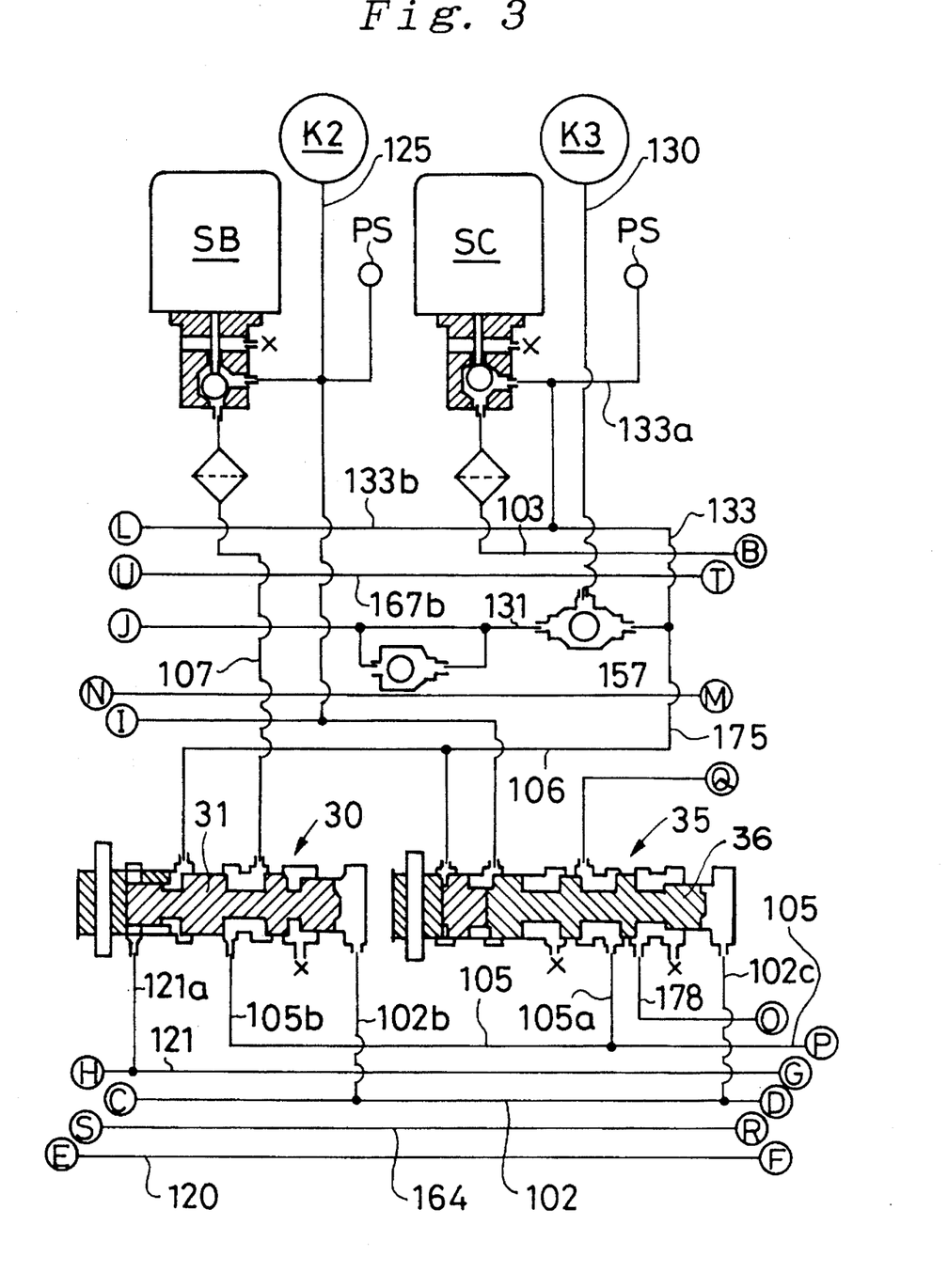
Figure 4:
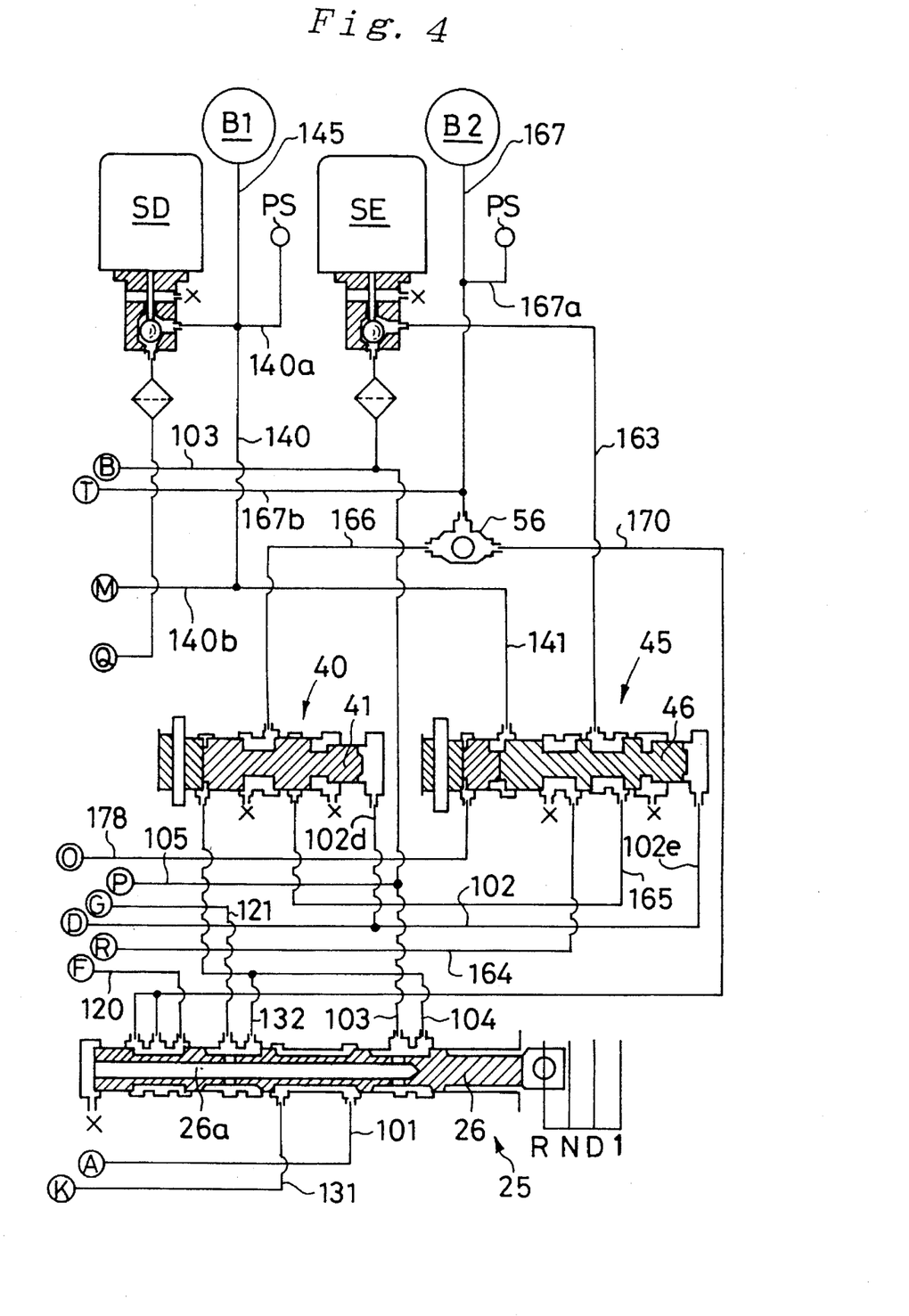

The hydraulic control unit according to the present invention for controlling engagement and disengagement of the first, second and the third clutches K1,K2,K3, and the first and second brakes B1,B2 will be described below with reference to FIGS. 2 through 4. FIGS. 2 through 4 show different sections of the hydraulic control unit, and jointly represent the hydraulic control unit in its entirety.

In these figures, hydraulic passages whose ends are marked with alphabetical letters A through T enclosed by a circle are connected to hydraulic passages whose ends are marked with identical alphabetical letters A through T enclosed by a circle.

Ports marked with "X" are connected to a drain.

The first, second and third clutches K1,K2,K3 and the first and second brakes B1,B2 are controlled in operation by the pressure of working oil supplied from an oil tank 90 by an oil pump 91. As shown in FIG. 2, the working oil supplied by the oil pump 91 to a hydraulic passage 101 is applied through a hydraulic passage 101a to a regulator valve 20 by which the pressure is regulated to a first predetermined line pressure P1.

Part of the working oil is then supplied from the regulator valve 20 under the line pressure PR to the hydraulic passage 102. The remaining working oil is supplied from the regulator valve 20 to a hydraulic passage 151. The working oil flowing to the hydraulic passage 151 is supplied to a torque converter (not shown).

The working oil in the hydraulic passage 102, whose pressure has been to the line pressure P1, is supplied to various components shown in FIGS. 2 to 4 for controlling gear shifts to be made by the automatic transmission.

The hydraulic control unit as shown in FIGS. 2 to 4 includes a manual valve 25 which is manually operable by a driver of the automobile and is connected to the shift lever at the driver's seat, five solenoid valves SA to SE (operating pressure control means) controlled by an electric controller (not shown) in response to the operation of the manual valve 25, four hydraulically operated valves 30,35,40,45 which are operationally controlled in response to the operations of the manual valve 25 and the solenoid valves SA to SE, four accumulators 51 to 54, and five oil pressure sensors PS.

The solenoid valves SA, SC are of normal-open type, and are open when their solenoids are turned off (not energized). The solenoid valves SB,SD,SE are of normal-closed type, and are closed when their solenoids are turned off (not energized).

The valve 30 will be referred to as a first pressure relief valve, the valve 35 as a second pressure relief valve, the valve 40 as a brake relief valve, and the valve 45 as a switching valve.

Depending on the operation of the manual valve 25 and the solenoid valves SA to SE, the valves 30,35,40,45 are actuated to control gear shifts and also the operation of a lockup clutch of the torque converter. The relationship between the operations of the solenoid valves SA to SE and the gear positions established in response to the operations of these valves is shown in Table 2 below. In Table 2, "ON" and "OFF" represents the turning-on and turning-off, respectively, of the solenoids of the solenoid valves SA through SE. While the solenoid valves SA through SE are indicated as being selectively turned on and off in Table 2, each of the solenoid valves SA through SE comprises a duty-ratio controlled solenoid valve, and its duty ratio is controlled to achieve a desired gear shift characteristic upon a gear shift.

TABLE 2

| GEAR POSITION | SOLENOID | | | | |
|---|---|---|---|---|---|
| | SA | SB | SC | SD | SE |
| 1ST | OFF | OFF | ON | OFF | OFF* |
| 2ND | OFF | OFF | ON | ON | OFF** |
| 3RD | OFF | OFF | OFF | OFF | OFF** |
| 4TH | OFF | ON | ON | OFF | OFF** |

TABLE 2-continued

| GEAR POSITION | SOLENOID | | | | |
|---|---|---|---|---|---|
| | SA | SB | SC | SD | SE |
| 5TH | ON | ON | OFF | OFF | OFF** |
| REV | OFF (ON) | OFF | OFF | OFF | OFF |

*ON when an engine brake is applied.
**ON when the torque converter is locked up The process of establishing the gear positions with the solenoid valves SA through SE according to Table 2 will be described below.

At first, a condition that a D(drive) range is selected by a shift lever with a spool 26 of the manual valve 25 being moved to a D-position is described. As shown in FIG. 4, when a hook portion in the right end of the spool 26 is moved to the right into a position indicated by D, the spool 20 is placed in the D-position, the hydraulic passage 101 communicates with a hydraulic passage 103 and the working oil under the line pressure P1 is supplied to the hydraulic passage 103. Since the hydraulic passage 103 is connected with the solenoid valves SC and SE, the line pressure P1 is always applied to the solenoid valves SC and SE. Further, the working oil under the line pressure P1 is also supplied to a hydraulic passage 110 which is branched from the hydraulic passage 101 and connected with the solenoid SA (see FIG.2). Accordingly, the line pressure P1 is always applied to the solenoid SA, too.

The hydraulic passage 101 is connected with hydraulic passage 102 through the regulator valve 20. Hydraulic passages 102b through 102e which are branched from the passage 102 are respectively connected with the right ends of the first and second relief valves 30,35, the brake relief valve 40 and the switching valve 45.

Accordingly, spools of these valves 30,35,40,45 are pushed to the left by the line pressure P1 supplied through the passages 102b to 102e.

When the D-range is selected, a gear position is determined in the D-range depending on the engine load and the automobile running speed. Operation of the solenoid valves SA through SE is controlled to achieve the determined gear positions as shown in Table 2 above.

The clutches and the brakes are actuated by the solenoid valves in each of the gear positions as follows:

It is assumed that the 1ST gear position is to be established. In the 1ST gear position, the solenoid of the solenoid valve SC is turned on, and the solenoids of the other four solenoid valves are turned off. At this time, only the solenoid valve SA is open, and the other four solenoid valves are closed.

Since the line pressure P1 is applied through the hydraulic passage 110 to the solenoid valve SA, the working oil flows under the line pressure P1 through the solenoid valve SA into a hydraulic passage 120. The hydraulic passage 120, which is connected to the manual valve 25, is brought into communication with a hydraulic passage 121 connected with the first clutch K1 when the manual valve 25 is at the D-position. Thus, the working oil under the line pressure P1 is supplied through the oil passage 121 to the first clutch K1, which is engaged. Hydraulic passages 120a,120b are respectively connected with a hydraulic pressure sensor PS and a first accumulator 51. The first accumulator 51 prevents an abrupt increase of the operating pressure applied to the first clutch K1, thereby reducing shift shocks.

The line pressure P1 also acts on a left end of the first relief valve 30 through a hydraulic passage 121a connected with the hydraulic passage 121. Since the hydraulic force acting through the passage 102b on the first relief valve 30 is larger than the hydraulic force acting through the passage 121a because of different pressure-bearing areas of the right and left ends of the first relief valve 30, the spool 31 of the first relief valve 30 is shifted to the left as shown in FIG. 3.

A hydraulic passage 125 connected with the second clutch K2 is connected with the solenoid valve SB, and also with the second accumulator 52 and one of the hydraulic pressure sensors PS. Inasmuch as the solenoid valve SB is closed, the hydraulic passage 125 is connected with the drain through the solenoid valve SB, and hence the second clutch K2 is disengaged.

A hydraulic passage 130 connected with the third clutch K3 is connected with a hydraulic passage 131 or a hydraulic passage 133 through a shuttle valve 57. The passage 131 is connected with the manual valve 25. When the manual valve 25 is at the D-position, the hydraulic passage 131 is connected with the drain through an internal passage 26a of the spool 26 in the manual valve 25.

The hydraulic passage 133 is connected with the solenoid valve SC. Since the solenoid of the solenoid valve SC is turned on thereby closing the valve, the passage 133 is connected with the drain through the solenoid valve SC, whereby the third clutch K3 is also disengaged. The hydraulic passages 133a,133b are respectively connected with the pressure sensor PS and the fourth accumulator 54. A hydraulic passage 175 branched from the passage 133 is connected with the middle portion of the first relief valve 30 and the left end of the second relief valve 35.

A hydraulic passage 140 connected with the first brake B1 through a hydraulic passage 145 is connected with the solenoid valve SD. Since the solenoid valve SD is closed, the passage 145 is connected with the drain through the solenoid valve SD, whereby the first brake B1 is also disengaged. Hydraulic passages 140a,140b branched from the passage 140 are connected with the pressure sensor PS and the third accumulator 53. Also, a hydraulic passage 141 branched from the passage 140 is connected with the switching valve 45.

A hydraulic passage 167 connected with the second brake B2 is connected either with a hydraulic passage 166 or with a hydraulic passage 170 through a shuttle valve 56. The passage 170 is connected to the left end of the manual valve 25. The passage 166 is connected with the brake relief valve 40. When the manual valve 25 is at the D-position, hydraulic passages 132,104 are connected with the drain through the internal passage 26a of the spool. Accordingly, a spool 41 is moved to the left by the line pressure P1 applied on its right end through the passage 102d, whereby the passage 166 is blocked from the passage 165.

No working oil is supplied to the second brake B2 and accordingly the second brake B2 is also disengaged. Therefore at the 1ST gear position in the D-range, no engine brake is obtained.

However, when the manual valve 25 is moved to the "1"-position shown in FIG.4 to shift to the "1"-range, an engine brake can be obtained. When the manual valve 25 is moved to the "1"-position, the hydraulic passage 104 is connected with the hydraulic passage 101 to apply the line pressure P1 on the left end of the brake relief valve 40, whereby the spool 41 is moved to the right. Since the solenoid of the solenoid valve SC is turned on and the solenoids of the solenoid valves SB,SD are turned off in "1"-range as in the D-range, the spool 46 of the switching valve 45 is held to be moved to the left. Accordingly, the hydraulic passage 166 is connected with the passage 165, and the hydraulic passage 167 connected with the second brake B2 is connected with the solenoid valve SE through the passages 166,165, the switching valve 45 and the passage 163. When the solenoid of the solenoid valve SE is turned on to open the solenoid valve SE as shown in Table 2, the operating hydraulic pressure is supplied to the second brake B2 to obtain an engine brake.

Now, it is assumed that the 2ND gear position is to be established while in the D-range selection. To achieve the 2ND gear position from the 1ST gear position, only the solenoid of the solenoid valve SD is switched from the turned-off state to the turned-on state, opening the solenoid valve SD. The first clutch K1 remains engaged. When the solenoid valve SD is opened, the working oil under the line pressure P1 is supplied to the first brake B1 through hydraulic passages 105,105a branched from the passage 105, the second relief valve 35, the passage 106 and the passage 145, engaging the first brake B1. An abrupt engagement of the first brake B1 is restrained by means of the third accumulator 53 to reduce a shift shock.

Thus, the first clutch K1 and the first brake B1 are engaged to establish the 2ND gear position.

When the solenoid valve SD is open, the working oil under the line pressure P1 acts on the left end of the spool 46 of the switching valve 45 through the hydraulic passages 140,141. Although the line pressure P1 acts on the right end of the spool 46 through the hydraulic passage 102e, the spool 46 is moved to the right because of the difference in pressure bearing area. When the spool 46 is moved to the right, the hydraulic passage 163 is connected with the passage 164. The passage 164 is connected with the above-mentioned lock-up control hydraulic circuit. Therefore, as shown in Table 2, when the solenoid of the solenoid valve SE is turned on, operation of the lock-up clutch can be controlled by supplying the operating pressure.

Now, it is assumed to be shifted to the 3RD gear position from the 2ND gear position while in the D-range selection. To shift from the 2ND to the 3RD gear position, the solenoids of the solenoid valves SC,SD are turned off, and hence the solenoids of all the solenoid valves SA,SB,SC, SD,SE are turned off. From the 2ND gear position, the solenoid valve SC is opened, and the solenoid valve SD is closed. Since the solenoid valve SA is open, the first clutch K1 remains engaged. Further, since the solenoid of the solenoid valve SD is turned off thereby closing the valve, the hydraulic passage 145 is connected with the drain through the solenoid valve SD, disengaging the first brake B1.

When the solenoid valve SC is opened, the working oil under the line pressure P1 is supplied to the hydraulic passage 133. Accordingly, the working oil is supplied to the third clutch K3 through the shuttle valve 57 to engage the third clutch K3. The fourth accumulator 54 helps to reduce a shift shock.

Thus the first and the third clutches K1,K2 are engaged to establish the 3RD gear position.

At the 3RD gear position, the solenoid of the solenoid valve SD is turned off and therefore the hydraulic passage 145 is connected with the drain through the solenoid valve SD. As a result, the pressure in the passages 140,141 which act on the spool 46 of the switching valve 45 is reduced to zero. While, since the solenoid of the solenoid valve SC is turned off, the line pressure P1 acts on the left end of the second relief valve 35 through the passages 133,175, whereby the spool 36 is moved to the right because of the difference in pressure bearing area. Then the hydraulic passage 105a which is communicated with the passage 103 is connected with the passage 178. The line pressure P1 acts on the left end of the switching valve 45 to keep the spool 46 of the switching valve 45 moved to the right. When the solenoid of the solenoid valve SE is turned on, the lock-up clutch can be operationally controlled.

Now, the transmission is to be shifted from the 3RD gear position to the 4TH gear position while in the D-range selection. From the 3RD gear position, the solenoids of the solenoid valves SB,SC are turned on. The solenoid valve SB is opened and the solenoid valve SC is closed. As the solenoid valve SA has already been open, the first clutch K1 remains engaged. Further, when the solenoid valve SC is closed, the supply of the line pressure P1 to the third clutch K3 is stopped to disengage it.

The spool 31 of the first relief valve 30 is moved to the left as shown in FIG.3, allowing the working oil under the line pressure P1 to flow from the hydraulic passage 103 through the first relief valve 30 to a hydraulic passage 107, from which the working oil is supplied through the solenoid valve SB and the hydraulic passage 125 to the second clutch K2, which is now engaged. The second accumulator 52 helps to reduce a shift shock.

The first clutch K1 and the second clutch K2 are thus engaged to establish the 4TH gear position.

Since the solenoid of the solenoid valve SB is turned on, the line pressure P1 acts on a left second port of the second relief valve 35 through the passage 125c to move the spool 36 to the right. Accordingly, the line pressure through passage 178 acting on the left end of the switching valve 45 allows the spool 46 to move to the right. As clearly understood, when the solenoid of the solenoid valve SE is turned on, the lockup clutch can be operationally controlled.

Now, the transmission is to be shifted from the 4TH gear position to the 5TH gear position while in the D-range selection. To effect a shift from the 4TH gear position to the 5TH gear position, the solenoid of the solenoid valve SA is turned on and the solenoid of the solenoid valve SC is turned off. Therefore, from the 4TH gear position, the solenoid valve SA is closed and the solenoid valve SC is opened.

When the solenoid valve SA is closed, the supply of the line pressure P1 through the hydraulic passage 120, 121 is cut off, disengaging the first clutch K1.

The hydraulic pressure supplied to the hydraulic passage 121a is also reduced to zero, so that the spool 31 of the first relief valve 30 remains shifted to the left. Since the solenoid of the solenoid valve SB remains turned on, the second clutch K2 remains engaged.

When the solenoid valve SC is opened, the working oil under the line pressure P1 is supplied to the hydraulic passage 133, and then through the shuttle valve 57 to the third clutch K3, thereby the third clutch K3 is engaged. The fourth accumulator 54 helps to reduce a shift shock.

In this manner, the second clutch K2 and the third clutch K3 are thus engaged to establish the 5TH gear position.

Operations of the lock-up clutch can be controlled at the 5TH gear position as at the 4TH gear position.

As described above, each gear position can be set at D-range. Further, the operations of the lock-up clutch can be controlled at the 2ND through 4TH gear positions. However, at these gear positions the solenoid valve SC may malfunction to be remained turned on at 3RD gear position which should be turned off, or the solenoid valve SB may malfunction to be remained turned off at 4TH or 5TH gear position which should be turned on, whereby the line pressure P1 which works as a pilot pressure cannot be supplied to the left end of the switching valve 45. Further, the spool 46 of the switching valve 45 may stick and stay moved to the left. Under these malfunctioning or sticking conditions, when the solenoid valve SE is opened to engage the lock-up clutch, the operating hydraulic pressure which should be supplied to the lock-up clutch is supplied to the second brake B2 to create engine brake if the hydraulic passage 163 is directly connected with the hydraulic passage 165 as in the hydraulic circuit of the prior art.

However, in the hydraulic control unit according to the present embodiments, the spool 41 of the brake relief valve 40 is moved to the left and the hydraulic passage 166 is disconnected from the hydraulic passage 165 by the spool 41 at 2ND through 4TH gear positions. Further, the passage 166 is connected with the drain through an inner passage in the brake relief valve 40. Accordingly, even if the spool 46 of the switching valve 45 is not moved to the right because of the above-mentioned malfunction or sticking, no operating pressure is supplied to the second brake B2 to avoid creating an unintentional engine brake. In the embodiment, the brake relief valve 40 is used as an opening-closing valve.

Figure 9:
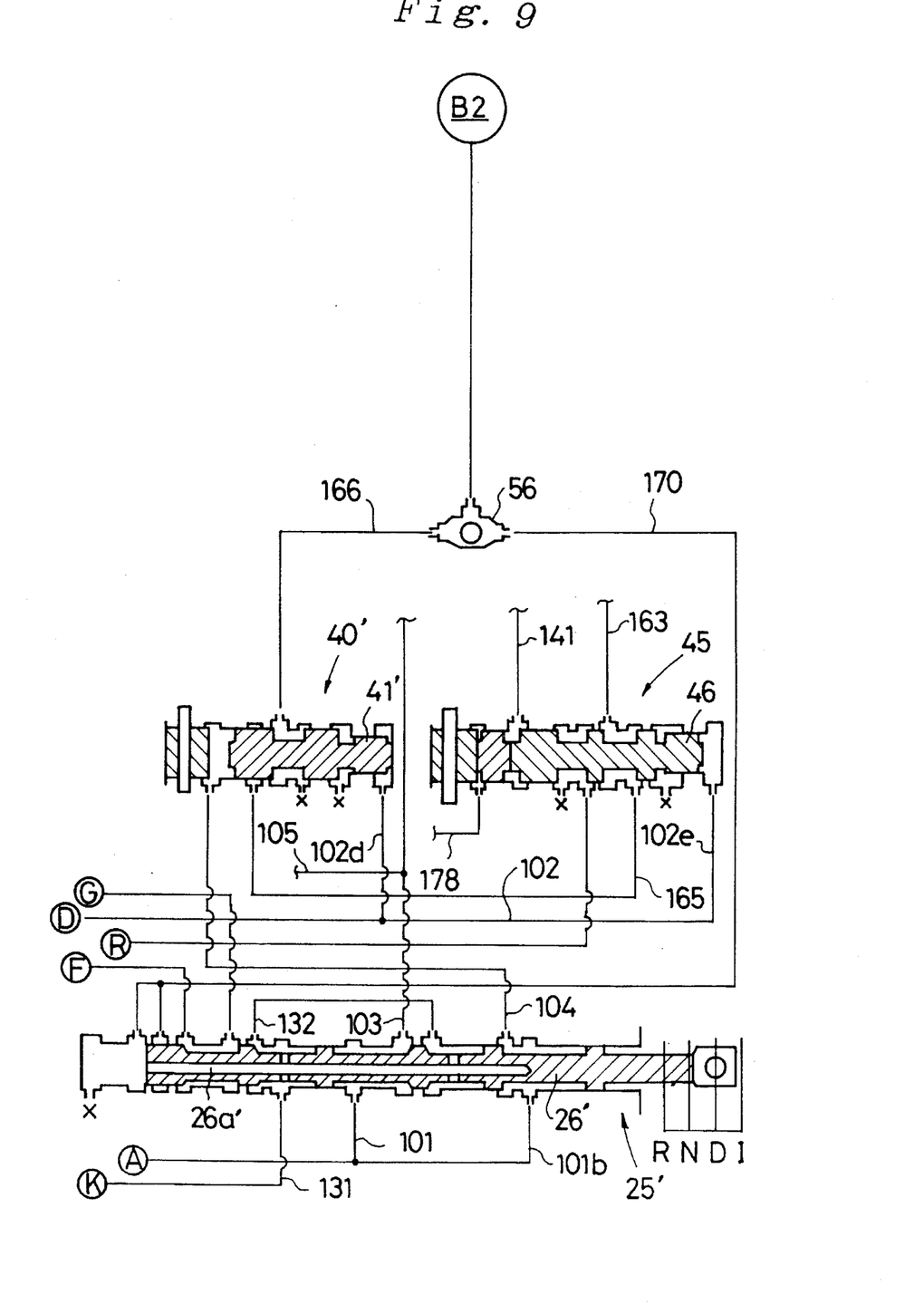
FIG. 9 is a hydraulic circuit diagram according to another modified embodiment of the invention.

Meanwhile, in the above embodiment, the brake relief valve 40 is opened to connect the hydraulic passage 165 with the passage 166 when the line pressure P1 (the pilot pressure) is supplied. The hydraulic control unit according to the present invention is not limited to the above embodiment. For example, as shown in FIG.9, the brake relief valve 40' can be constructed so as to be closed to disconnect the passage 165 from the passage 166 when the line pressure P1 (the pilot pressure) is supplied. The numerals shown in FIG.9 correspond to those shown in FIG.4.

The brake relief valve 40' and the manual valve 25' shown in FIG.9 are slightly different from the brake relief valve 40 and the manual valve 25 shown in FIG.4. In the brake relief valve 40', the second port from the left is connected with the hydraulic passage 165 and the central port (which is connected with the passage 165 in FIG. 4) is connected with the drain.

The manual valve 25' has two additional ports at the right end thereof and also has a new configuration at the right end of the spool 26' as shown in the figure. One of the additional ports is connected with the hydraulic passage 101b which is branched from the passage 101. The other of the additional ports is connected with the hydraulic passage 104 which connect with the left-end port of the brake relief valve 40'.

In the hydraulic circuit as constructed above and shown in FIG.9, when the manual valve 25' is moved to a position corresponding to the D-range, the hydraulic passage 101b is connected with the passage 104 to supply the line pressure P1 (the pilot pressure) to the left end of the brake relief valve 40'. Accordingly, the spool 41' of the brake relief valve 40' is moved to the right to disconnect the hydraulic passage 165 from the passage 166. However, when the manual valve 25' is moved to a position corresponding to the 1-range, the hydraulic passage 101b is closed by the spool 26' of the manual valve 25' and the passage 104 is connected with the drain through the internal passage 26a' in the spool 26'. Accordingly, the line pressure P1 is drained through the left end of the brake relief valve 40' to move the spool 41' to the left (to open the brake relief valve 40'). Since the hydraulic passage 165 is connected with the passage 166, the engine braking can be obtained at 1-range.

When the shift lever is moved to the position corresponding to the 1-range to move the manual valve 25 to the 1-range position in the embodiment of FIGS. 2–4, the spool 26 of the manual valve 25 is moved to a position at which the end connecting hole 26c locates at 1-position from D-position. Accordingly, at 1-range, the hydraulic passage 101 to which the line pressure is always supplied is connected with the passage 104 as well as the passage 103. The passage 120 is disconnected from the passage 121. The passage 120 is blocked by the land surface of the spool 26. The passage 121 is connected with the passage 132 through the groove 26b.

The 1ST gear position is always held at the 1-range. The solenoid valves SA through SE are turned on or off as shown at 1ST gear position in Table 2.

Since the hydraulic passage 104 is connected with the hydraulic passage 101, the line pressure is applied on the left end of the brake relief valve 40 to move the spool 41 to the right. The solenoid valve SC is turned on and the solenoid valves SB,SD are turned off at 1-range. No biasing force to the right is applied on the spool 46 of the switching valve 45 to keep the spool 46 moved to the left. The hydraulic passage 166 is connected with the passage 165 through the brake relief valve 40 and the hydraulic passage 167 which is connected with the second brake B2 is connected with the solenoid valve SE through the passages 166,165,163 and the switching valve 45. Accordingly, as shown in Table 2, when the solenoid valve SE is turned on and opened, the operating pressure is supplied to the second brake B2 to engage it and the engine braking can be obtained.

Since the hydraulic passage 120 is blocked by the land surface of the spool 26, the operating pressure supplied to the hydraulic passage 120 from the solenoid valve SA cannot be supplied further. While, since the hydraulic passage 121 is connected with the passage 132 through the groove 26b and the passage 132 is further connected with the passage 104, the line pressure P1 is always supplied to the first clutch K1 through the hydraulic passages 101,104,132 and 121.

At 1-range, the first clutch K1 and the second brake B2 are always engaged to set the 1ST gear position with the engine braking.

As shown in Table 1, in the hydraulic control circuit constructed as described above, the first clutch K1 is engaged to set the 1ST through 4TH gear positions at D-range. Further, it is engaged at 1-range to set the 1ST gear position. The engagement control of the first clutch K1 is carried out by the solenoid valve SA at D-range.

When the solenoid SA malfunctions electrically because of an electric wire disconnection or malfunctions mechanically because of a sticking of the spool, it may happen that the first clutch K1 cannot be engaged.

If the first clutch K1 cannot be engaged, none of the 1ST through 4TH gear positions can be set at D-range. Only the 5TH gear position can be obtained at D-range which severely deteriorates the running characteristics of the vehicle. However, in the present hydraulic control unit, when the shift lever is operated to move the manual valve 25 from the D-range position to the 1-range position, the line pressure is supplied to the first clutch K1 through the manual valve 25 bypassing the malfunctioned solenoid valve SA to engage the first clutch SA. In other words, even if the solenoid valve SA malfunctions at D-range, the operation of the shift lever from D-range position to the 1-range position allows engagement the first clutch K1 to establish the 1ST gear position. Accordingly, the running characteristics of the vehicle under the malfunctioning condition of the solenoid valve SA can be greatly improved.

In the present embodiment, the 1ST gear position is fixedly selected at the 1-range. But, the 1ST and 2ND gear positions can be selected at the 1-range. If so, under the malfunction condition of the solenoid valve SA, either the 1ST gear position or the 2ND gear position can be set at 1-range.

Following the above description about the operations at D-range and 1-range, then the operations at N-range are described hereinafter. When the N-range is selected, the clutches K1,K2,K3 and the brakes B1,B2 are connected with the drain through the manual valve 25, and hence are disengaged to bring the transmission into a neutral condition.

It is now assumed that an R(reverse)-range is selected by the shift lever. The spool 26 of the manual valve 25 is moved to the left, supplying the working oil under the line pressure P1 from the hydraulic passage 101 to the passage 131. The solenoids of all the solenoid valves SA,SB,SC,SD,SE are turned off except at the beginning of a shift to the R-range.

The hydraulic passage 121 connected with the first clutch K1 is drained by the manual valve 25, disengaging the first clutch K1. The hydraulic passage 125 connected to the second clutch K2 is drained by the solenoid valve SB, disengaging the second clutch K2.

Since the hydraulic passage 130 connected with the third clutch K3 is connected with the hydraulic passage 131 through the shuttle valve 57, the working oil supplied under the line pressure P1 to the hydraulic passage 131 is supplied to the third clutch K3, engaging the third clutch K3. The 4TH accumulator 54 helps to lessen a shift shock during engagement of the third clutch K3.

The hydraulic passage 145 connected with the first brake B1 is drained by the solenoid valve SD, disengaging the first brake B1.

The hydraulic passage 167 connected with the second brake B2 is connected with the solenoid valve SA through the shuttle valve 56, the passage 170, the manual valve 25 and the passage 120. Since the solenoid valve SA is of normal open type, the working oil under the line pressure P1 flows into the passage 170 to engage the second brake B2. At the same time, the working oil under the line pressure P1 flows into the first accumulator 51 to move the piston 51a to the left.

A back-pressure leading passage 181 branched from the passage 131 is connected to the middle portion of the first accumulator. A back-pressure supplying passage 182 is connected to the right end of the spool 21 of the regulator valve 20. A hydraulic groove 51b is formed on the central portion of the piston 51a. When the piston 51a is moved to the left, the back-pressure leading passage 181 is connected with the back-pressure supplying passage 182 through the hydraulic groove 51b. When the piston 51a is moved to the right, the back-pressure leading passage 181 is disconnected from the back-pressure supplying passage 182.

Accordingly, when the piston 51a of the first accumulator 51 is moved to the left, the line pressure P1 acts on the right end of the spool 21 of the regulator valve 20 as a back-pressure, through the passage 131, the back-pressure leading passage 181 and the back-pressure supplying passage 182. This hydraulic force tends to push the spool 21 toward the left and assists the force of the spring in regulator valve 20 to move the main spool leftward to increase the line pressure. Hence the line pressure is increased to a new line pressure P2 (P2>P1) which is supplied to the second brake B2. Therefore, the second brake B2 is strongly engaged by an engaging force larger than that at 1ST gear position.

The third clutch K3 and the second brake B2 are thus engaged to establish the reverse gear position.

However, if the second brake B2 is being engaged by a strong engaging force caused by the high line pressure P2 during the shift to the reverse gear position, the shift shock created by the engagement of the second brake B2 may be large. In order to maintain the engagement force low during engagement (from the beginning of the shift to the completion thereof), the solenoid valve SA is duty-ratio controlled. Therefore, "ON" mark enclosed by a parenthesis is added for the solenoid SA at REV in Table 2.

Specifically, from the beginning of the engagement of the second brake B2 to the completion of the engagement thereof (about 0.3 to 0.5 second), the solenoid valve SA is duty-ratio controlled so as to produce a specified low operating pressure (such as pressures of 2 to 3 kg/mm$^2$), whereby the piston 51a of the first accumulator 51 remains moved to the right to disconnect the back-pressure leading passage 181 from the back-pressure supplying passage 182. As a result, the low line pressure P1 (8 kg/mm$^2$) is produced and supplied to the solenoid valve SA. As shown by the line A in FIG. 6, under the low line pressure P1, the duty ratios required to obtain the low operating pressure to engage the second brake B2 smoothly (the operating pressures within the shaded range in FIG. 6) are 50 to 65% which are rather wide and are easy to control.

If the high line pressure P2 is used, as shown by the line B in FIG. 6, the duty ratios required to obtain the low operating pressure to engage the second brake B2 smoothly (the operating pressures within the shaded range in FIG. 6) are 92 to 93% which are very narrow. It is very difficult to control the duty ratios within such a narrow range.

Further, since the solenoid valve SA is operated under the low line pressure P1, it can be made compact which is advantageous.

Figure 5:
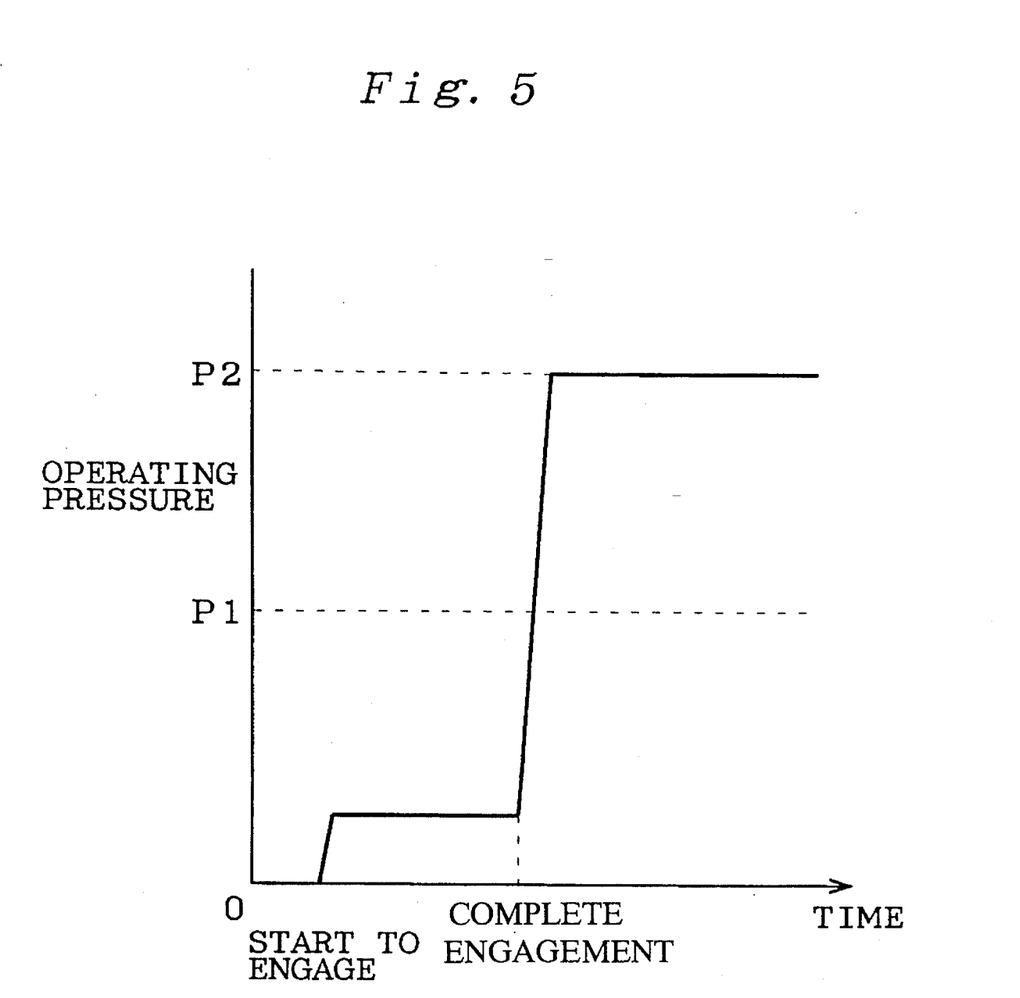
FIG. 5 is a graph showing time-dependent changes of the operating pressure regulated by the hydraulic control unit.

As generally shown in FIG.5, when the solenoid valve SA is turned off after the second brake B2 is engaged under the low line pressure P1, the working oil having the line pressure P1 is supplied to the hydraulic passage 121, whereby the piston 51a of the first accumulator 51 is moved to the left. As a result, the line pressure is increased to the high line pressure P2 to apply a fairly large engaging force to the second brake B2. Since the high line pressure P2 is supplied to the second brake B2 after the completion of the engagement, no shift shock is created. In the present embodiment, the solenoid valve SA is used as operating pressure controlling means and the first accumulator is used as line pressure switching means.

Figure 7:
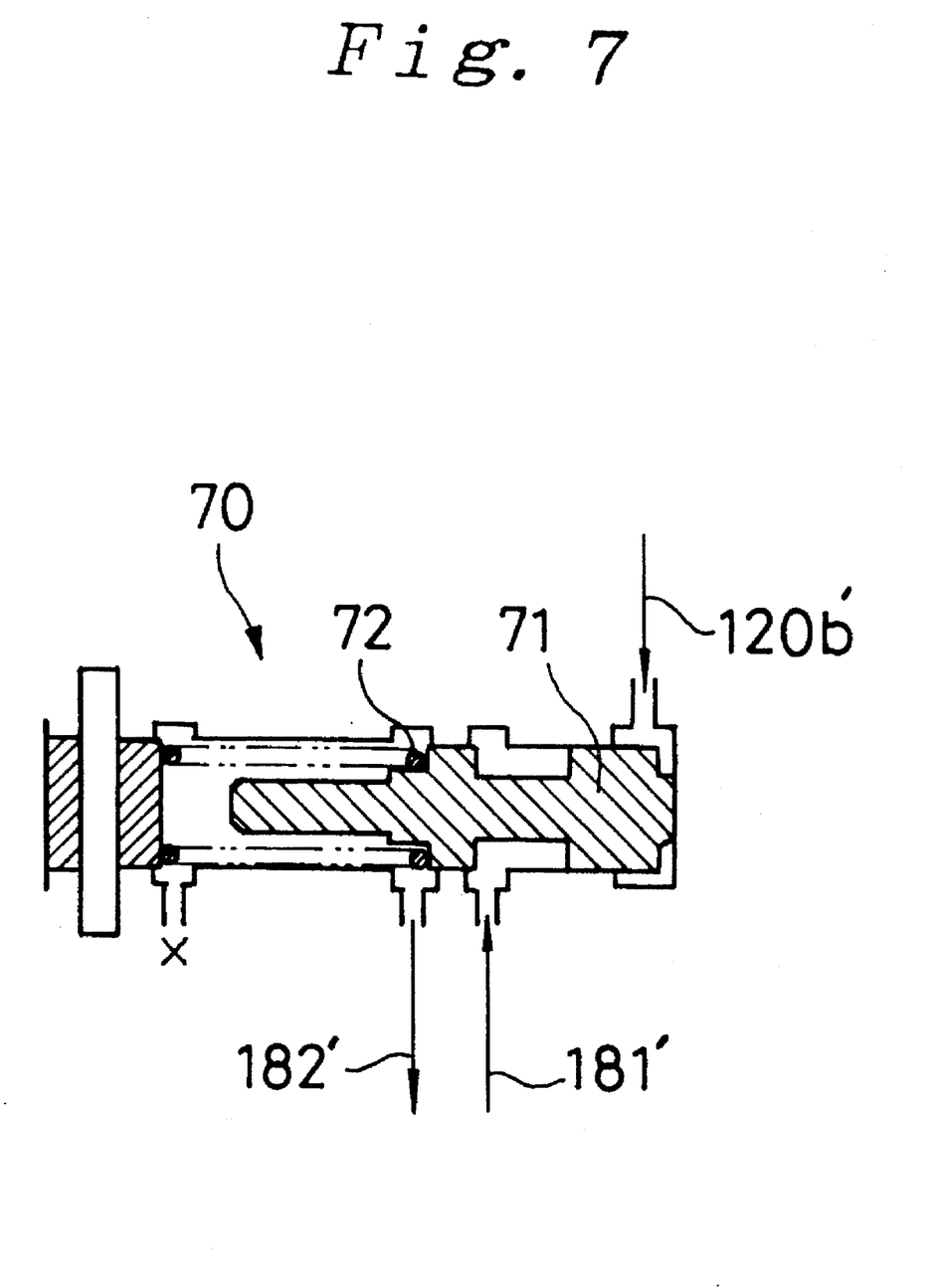
FIG. 7 is a hydraulic circuit diagram of an open-close switching valve used in the hydraulic control unit.

In the above embodiment, although the piston 51a of the first accumulator 51 is used as on-off switching means, an on-off switching valve 70 as shown in FIG.7 can be provided additionally. A hydraulic passage 120b' connected with the passage 121 is connected with the right end of the on-off switching valve 70. When the hydraulic pressure supplied through the passage 120b' exceeds a specified pressure to move the spool 71 to the left against the biasing force of a spring 72, a back-pressure leading passage 181' is connected with a back-pressure supplying passage 182' in the middle portion of the on-off switching valve 70. In this manner, the on-off switching valve 70 serves as on-off switching means instead of the first accumulator 51 shown in FIG. 2.

Figure 8:
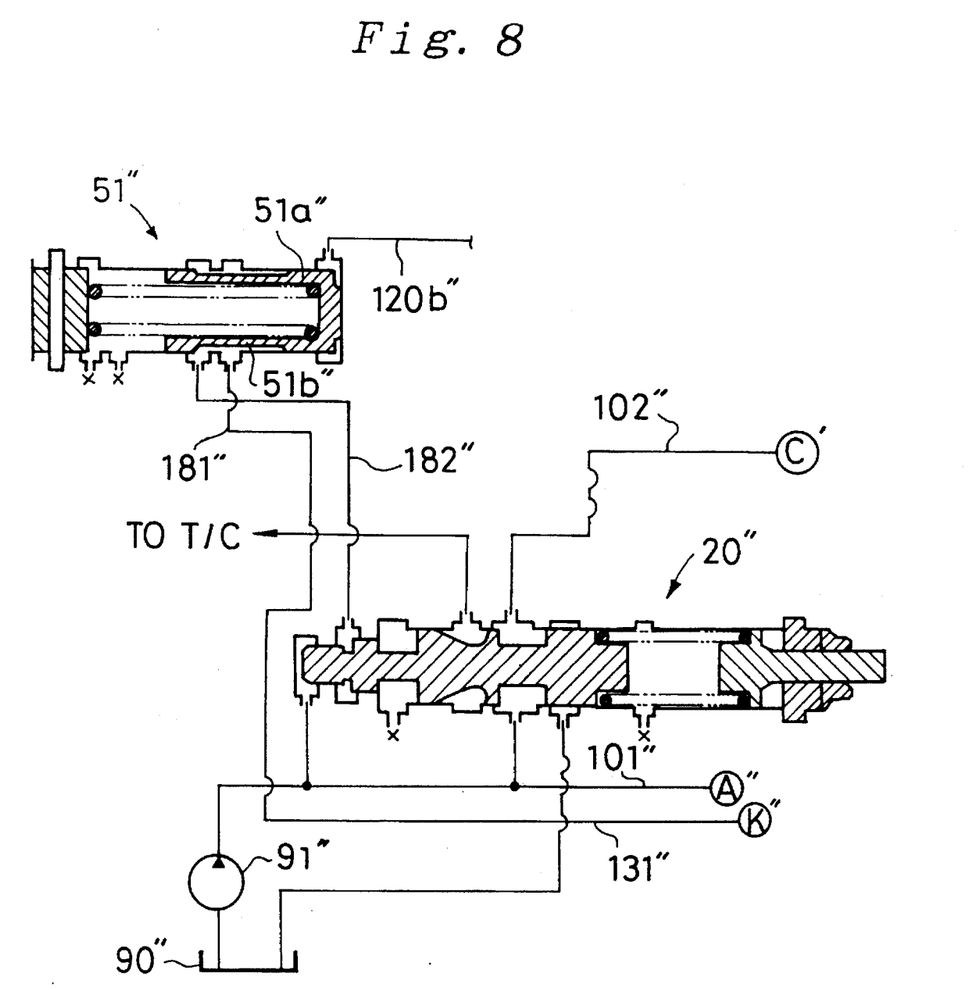
FIG. 8 is a hydraulic circuit diagram of a line-pressure regulating valve and an open-close switching valve in the hydraulic control unit according to a modified embodiment of the invention.

In the above embodiment, the line pressure is increased when a back-pressure is supplied to the regulator valve 20, i.e. the back-pressure is used as an assist pressure to increase the line pressure. A regulator valve 20" as shown in FIG. 8 can also be used. When an internal pressure (an assist pressure) is supplied to the left second port through a internal pressure supplying passage 182" in the regulator valve 20", the line pressure is lowered.

When the regulator valve 20" is used, the first accumulator 51" is slightly different from the first accumulator 51 shown in FIG.2. An internal pressure leading passage 181" instead of the back-pressure leading passage 181 is connected with the first accumulator (on-off switching means) 51". An internal pressure supplying passage 182" instead of the back-pressure supplying passage 182 is also connected with the first accumulator 51" Further a new drain port is added.

In the hydraulic circuit shown in FIG. 8, when the operating pressure supplied to the right end of the first accumulator 51" through a passage 120b" branched from the output passage of the solenoid valve SA is lower than a specified pressure, the piston 51a" of the first accumulator 51" is moved to the right to connect the internal-pressure leading passage 181" with the internal-pressure supplying passage 182". Since an internal pressure acts on the regulator valve 20" through the internal-pressure supplying passage 182", the low line pressure is produced which is supplied to the solenoid valve SA.

When the operating pressure supplied to the right end of the first accumulator 51" through a passage 120b" is higher than a specified pressure, the piston 51a" of the first accumulator 51" is moved to the left to disconnect the internal-pressure leading passage 181" from the internal pressure supplying passage 182". At the same time, the internal pressure supplying passage 182" is connected with the drain. Accordingly, no internal pressure is supplied to the regulator valve 20", and the internal pressure in the regulator valve 20" is reduced to zero. As a result, the line pressure produced by the regulator valve 20" is increased.

What is claimed is:

1. A hydraulic control unit for an automatic transmission having a plurality of power transmitting paths and a plurality of engaging means for selecting any one of said transmitting paths to set a gear position comprising:

regulator valve means for producing a line pressure;

operating pressure control means for producing an operating pressure supplied to said engaging means by regulating said line pressure from said regulator valve; and line pressure switching means for making the line pressure produced by said regulator valve low when a target operating pressure set by said operating pressure control means is lower than a specified value and making the line pressure high when the target operating pressure is higher than the specified value during a shift to a specified gear position.

2. A hydraulic control unit for an automatic transmission according to claim 1; wherein said line pressure switching means comprises;

an assist pressure supplying circuit for supplying an assist pressure to said regulator valve means to switch the line pressure produced by said regulator valve means from the low pressure to the high pressure; and on-off switching means for closing said assist pressure supplying circuit when the target operating pressure is lower than said specified value and for opening said assist pressure supplying circuit when the target operating pressure is higher than said specified value.

3. A hydraulic control unit for an automatic transmission according to claim 1; wherein said line pressure switching means comprises;

an assist pressure supplying circuit for supplying an assist pressure to said regulator valve means to switch the line pressure produced by said regulator valve means from the high pressure to the low pressure; and on-off switching means for opening said assist pressure supplying circuit when the target operating pressure is lower than said specified value and for closing said assist pressure supplying circuit when the target operating pressure is higher than said specified value.

4. A hydraulic control unit for an automatic transmission according to claim 1, 2 or 3; wherein the line pressure under said low pressure is used by said operating pressure controlling means at any gear positions except said specified gear position.

5. A hydraulic control unit for an automatic transmission according to claim 4; wherein said specified gear position includes a reverse gear position.

6. A hydraulic control unit for an automatic transmission having a plurality of power transmitting paths and a plurality of engaging means for selecting any one of said transmitting paths to set a gear position comprising:

regulator valve means for producing a line pressure;

operating pressure control means for producing an operating pressure supplied to said engaging means by regulating said line pressure from said regulator valve;

a shift lever for selecting a shift range;

a manual valve moved to a position corresponding to said shift range selected by said shift lever, said operating pressure being allowed by said manual valve to be supplied to said engaging means corresponding to said selected shift range;

a first opening-closing valve disposed on a hydraulic passage connecting said operating pressure control means with an engine brake engaging means which is engaged when an engine braking is required and disconnecting said operating pressure control means from said engine brake engaging means to disengage said engine brake engaging means when engine braking is not required; and the operations of said opening-closing valve being controlled based on the position of said manual valve.

7. A hydraulic control unit for an automatic transmission according to claim 6; wherein said opening-closing valve is opened when said manual valve is moved to a position corresponding to a shift range in which the engine braking is required, and said opening-closing valve is closed when said manual valve is moved to a position corresponding to a shift range in which the engine braking is not required.

8. A hydraulic control unit for an automatic transmission according to claims 6 or 7; wherein said opening-closing valve is opened when a pilot pressure is supplied thereupon; and said pilot pressure is supplied to said opening-closing valve only when said manual valve is moved to the position corresponding to the shift range in which the engine braking is required.

9. A hydraulic control unit for an automatic transmission according to claims 6 or 7; wherein said opening-closing valve is closed when a pilot pressure is supplied thereupon; and said pilot pressure is exhausted through said opening-closing valve only when said manual valve is moved to the position corresponding to the shift range in which the engine braking is required.

10. A hydraulic control unit for an automatic transmission according to claims 6 or 7; wherein said automatic transmission further includes a torque converter with a lock-up clutch, and said operating pressure control means controls supplying the operating pressure to said lock-up clutch as well as said engine brake engaging means;

said hydraulic control unit further comprises a supply selection valve for selectively supplying the operating pressure to said lock-up clutch and said engine brake engaging means, and a second opening-closing valve disposed on a hydraulic passage for supplying the operating pressure from said supply selection valve to said engine brake engaging means; and the operations of said second opening-closing valve is controlled based on the position of said manual valve.

11. A hydraulic control unit for an automatic transmission according to claim 10; wherein said opening-closing valve is opened when said manual valve is moved to a position corresponding to a shift range in which the engine braking is required, and said opening-closing valve is closed when said manual valve is moved to a position corresponding to a shift range in which the engine braking is not required.

12. A hydraulic control unit for an automatic transmission according to claim 11; wherein said opening-closing valve is opened when a pilot pressure is supplied thereupon; and said pilot pressure is supplied to said opening-closing valve only when said manual valve is moved to the position corresponding to the shift range in which the engine braking is required.

13. A hydraulic control unit for an automatic transmission according to claim 11; wherein said opening-closing valve is closed when a pilot pressure is supplied thereupon; and said pilot pressure is exhausted through said opening-closing valve only when said manual valve is moved to the position corresponding to the shift range in which the engine braking is required.

* * * * *